United States Patent [19]

Onuma et al.

[11] Patent Number: 5,759,466
[45] Date of Patent: Jun. 2, 1998

[54] METHOD OF MAKING LIP-TYPE OIL SEALS HAVING IMPROVED SEALING EDGE

[75] Inventors: Tsunehisa Onuma, Fukushima; Hideyuki Furuyama, Date-gun, both of Japan

[73] Assignee: NOK Corporation, Tokyo, Japan

[21] Appl. No.: 648,574

[22] Filed: May 16, 1996

[30] Foreign Application Priority Data

May 25, 1995 [JP] Japan .................. 7-152699

[51] Int. Cl.⁶ .......................... B29C 37/02
[52] U.S. Cl. .................. 264/161; 264/138; 264/267; 264/268; 277/134; 277/152; 425/DIG. 47
[58] Field of Search ................ 264/268, 267, 264/138, 161; 425/DIG. 47; 277/134, 152

[56] References Cited

U.S. PATENT DOCUMENTS

| | | | |
|---|---|---|---|
| 3,347,554 | 10/1967 | Jagger et al. | 277/134 |
| 3,534,969 | 10/1970 | Weinand | 277/1 |
| 3,633,927 | 1/1972 | Van Deven | 277/134 |
| 3,767,739 | 10/1973 | Smith | 264/268 |
| 4,094,519 | 6/1978 | Heyn et al. | 277/134 |
| 4,300,777 | 11/1981 | Symons | 277/153 |

FOREIGN PATENT DOCUMENTS

| | | | |
|---|---|---|---|
| 970407 | 7/1975 | Canada | 277/134 |
| 1252911 | 11/1971 | United Kingdom. | |

Primary Examiner—Jan H. Silbaugh
Assistant Examiner—Edmund H. Lee
Attorney, Agent, or Firm—Jacobson, Price, Holman & Stern, PLLC

[57] ABSTRACT

Lip-type oil seals (10) having helical pumping ribs (40) are manufactured by preparing a molded foreproduct of the seal and by trimming a hat portion (62) to form a sharp sealing edge (32). Each of the pumping ribs (40) is configured to include a first section (50) of a uniform cross-section and a bilge-shaped second section (52). Trimming is made along a trim line (68) that intersects in between the length of the first sections (50) to ensure that a length of the first sections (50) is preserved between the sealing edge (32) and the second sections (52) regardless of the tolerance of positioning of a trimming knife. Oil seals having an improved initial static and dynamic sealing performance is obtained. The second sections (52) achieves a satisfactory pumping action even after a substantial wear has taken place.

7 Claims, 7 Drawing Sheets

METHOD OF MAKING LIP-TYPE OIL SEALS HAVING IMPROVED SEALING EDGE

BACKGROUND OF THE INVENTION

1. Field of the Invention

The present invention relates to oil seals for establishing a seal between relatively movable shaft and housing. More particularly, the present invention is concerned with lip-type oil seals having hydrodynamic pumping means and a method of making thereof.

2. Description of the Prior Art

Lip-type oil seals having hydrodynamic pumping elements are disclosed, for example, in U.S. Pat. No. 3,347,554 to Jagger et al and U.S. Pat. No. 3,534,969 to Weinand. The seal includes a sealing lip defined by a pair of frustoconical surfaces. Under static conditions of the seal, the sealing lip resiliently engages with the shaft to form a seal band whereby a static fluid seal is achieved.

The frustoconical surface facing the atmospheric region is provided with a plurality of helical pumping ribs or screw threads. Under dynamic conditions, the pumping ribs scrape oil film on the shaft and hydrodynamically feed oil back to the sealed region. In certain conventional designs, the pumping ribs have a uniform triangular cross-section throughout the length thereof.

The problem associated with the conventional pumping ribs having a uniform triangular cross-section is that the hydrodynamic pumping capacity thereof is prematurely decreased with increasing wear.

U.S. Pat. No. 4,094,519 to Heyn et al discloses an oil seal having so-called "bilge-shaped" pumping ribs. Each of the pumping ribs is defined by a pair of curved side faces meeting with each other to define a curved working edge. The pumping ribs have a varying cross-section but have no height at the end near the static seal band.

The advantage of the "bilge-shaped" pumping ribs over the pumping ribs of the uniform triangular cross-section is that a satisfactory pumping action is achieved even after a substantial wear has taken place.

However, the problem which must be overcome in manufacturing the oil seals having the bilge-shaped pumping ribs is that it is extremely difficult to trim the sealing lip with a complete accuracy. Generally, trimming of the seal lips is carried out by a trimming machine wherein a trimming knife is moved along a trim line by a hydraulic cylinder. Unfortunately, the positioning of the trimming knife could not be perfectly accurate and generally involves a tolerance of about 0.2–0.3 mm.

If unfortunately the trim line were offset outwardly of the very end of the bilge-shaped pumping ribs, the pumping ribs of a substantial height would appear on the sealing edge. This causes lifting of the sealing edge away from the shaft and results in a failure of initial static sealing.

If conversely the trimming knife were inadvertently offset inwardly of the end of the bilge-shaped pumping ribs, the pumping ribs would not be brought into contact with the shaft for a sufficient extent. The result of this is that the initial hydrodynamic pumping action is insufficient.

SUMMARY OF THE INVENTION

It is therefore an object of the present invention to provide a method of making an oil seal having a high degree of static and dynamic sealing performance regardless of the tolerance of trimming.

Another object of the invention is to provide a method of making an oil seal having an improved initial static sealing performance.

A still another object of the invention is to provide a method of making an oil seal having an improved initial hydrodynamic pumping capability.

A further object of the invention is to provide a method of making an oil seal which achieves an improved hydrodynamic pumping capacity even after a substantial wear has taken place.

These objects are achieved by the method according to the invention wherein a foreproduct of the oil seal incorporating a rigid annular casing and a molded elastomeric member is first prepared. The elastomeric member as-molded includes an annular lip forming portion, a hat portion and a plurality of helical pumping ribs formed on the frustoconical inner surface of the lip forming portion. Each of the pumping ribs includes a first section of a uniform cross-section having a controlled height and a bilge-shaped second section.

The foreproduct is then subjected to trimming to remove the hat portion and to form a sharp sealing edge. Trimming is performed in such a manner as to cut in between the length of the first sections as molded.

As the first sections of the pumping ribs as molded have a predetermined axial extent, a length of the first sections is always preserved between the sealing edge and the second sections even if trimming was conducted with a certain tolerance. Since the first sections are of a controlled height, they are readily flattened upon installation to form a continuous static seal band to thereby establish a satisfactory initial static seal.

The length of the first sections in contact with the shaft but lying outside the static seal band achieves the dynamic pumping action to establish a satisfactory initial dynamic seal.

These features and advantages of the invention, as well as other features and advantages thereof, will become apparent from the following description.

DESCRIPTION OF THE PREFERRED EMBODIMENT

Figure 1:
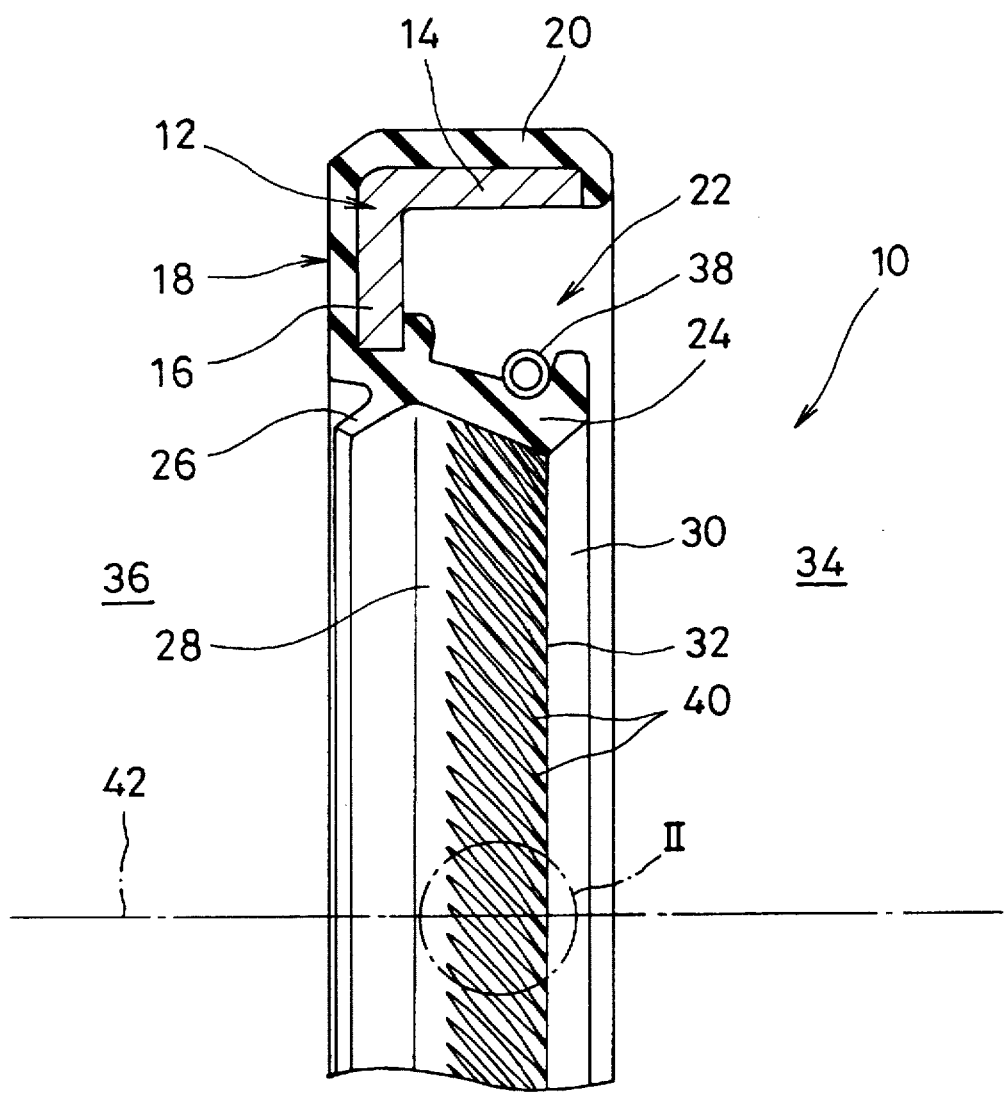
FIG. 1 is a fragmentary cross-sectional view showing the oil seal made according to the method of the invention.
Figure 2:
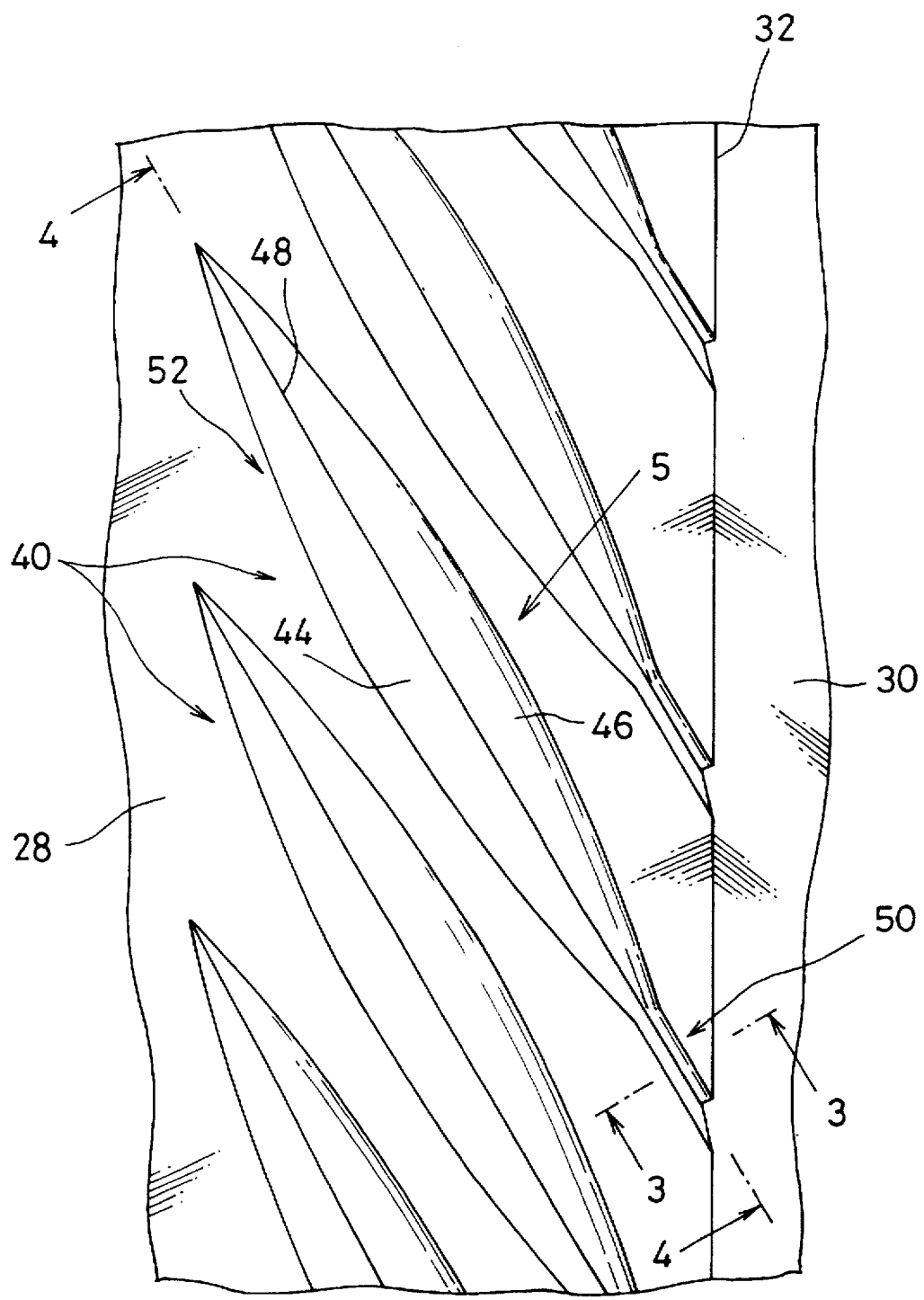
FIG. 2 is an elevational view showing the portion of the oil seal encircled by the circle II in FIG. 1.
Figure 3:
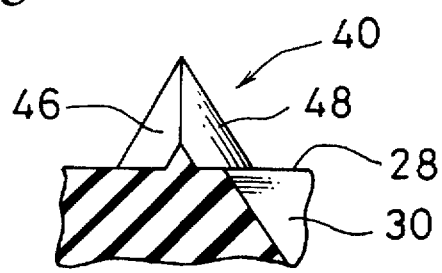
FIG. 3 is a cross-sectional view taken along the line 3—3 of FIG. 2.
Figure 4:
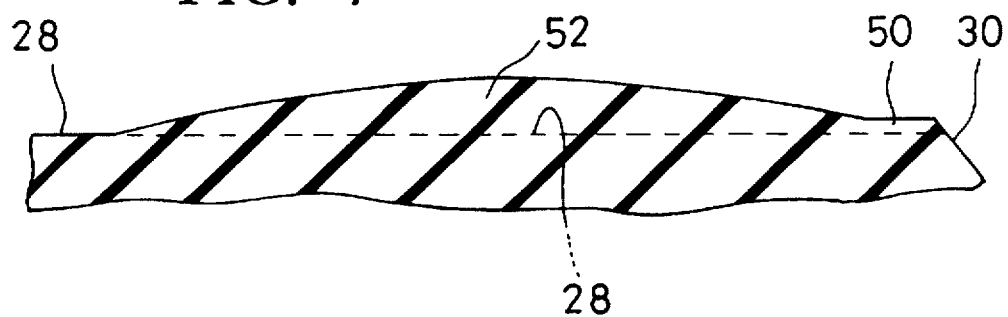
FIG. 4 is a cross-sectional view taken along the line 4—4 of FIG. 2.
Figure 5:
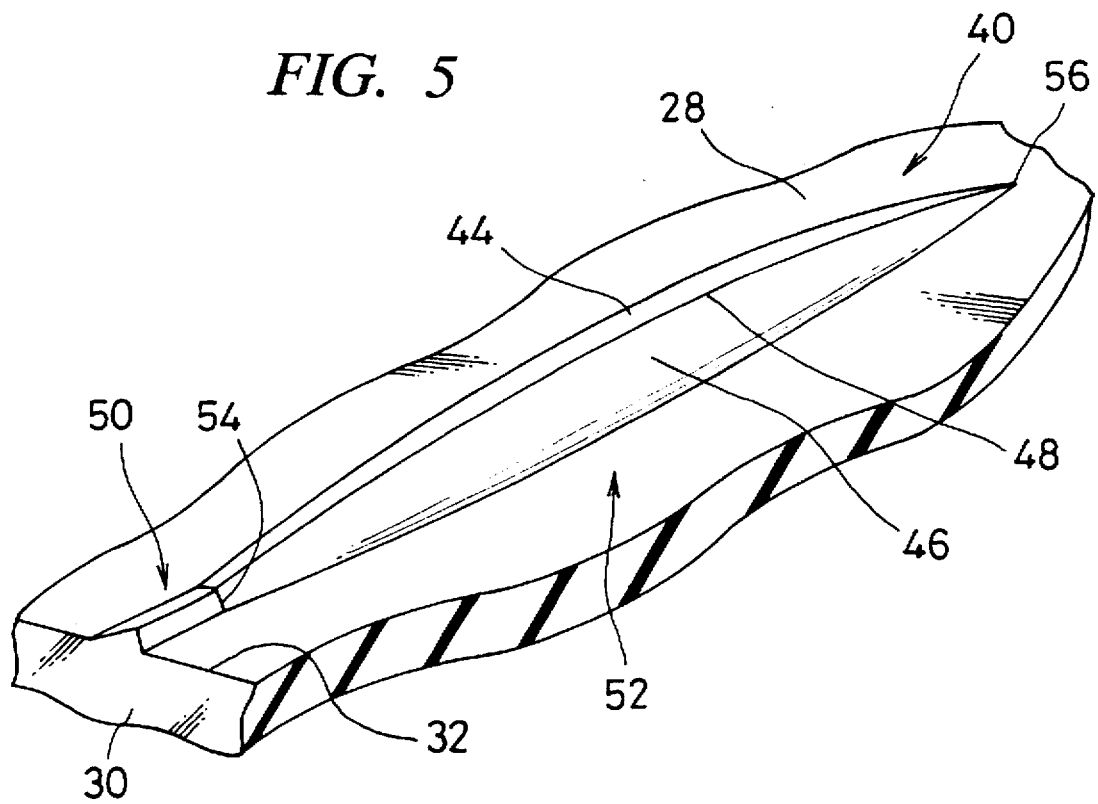
FIG. 5 is a perspective view showing a pumping rib as viewed in the direction of the arrow 5 of FIG. 2.

Referring to FIG. 1, the oil seal 10 includes an annular casing 12 made, for example, by stamping of a sheet metal blank. Similar to the conventional design, the casing 12 has a tubular mounting portion 14 and a radial bonding flange 16. Bonded to the casing 12 is an elastomeric member 18 having an axially extending portion 20 adapted to be interference fit within a housing, not shown, and an annular sealing portion 22 sealingly engageable with a shaft as described later.

The sealing portion 22 includes a primary sealing lip 24 and a dust sealing lip 26. The primary sealing lip 24 is defined by a pair of frustoconical surfaces 28 and 30 meeting with each other to form a sharp sealing edge 32. According to the terminology commonly used in the art, the frustoconical surface 30 facing the sealed region 34 will be referred to as the "oil side" surface and the opposite surface 28 directed to the atmospheric region 36 as the "air side" surface. A conventional garter spring 38 is mounted within a spring groove formed on the outer periphery of the primary sealing lip 24.

The air side surface 28 is provided with a plurality of helical pumping elements or ribs 40 which are circumferentially evenly spaced apart from each other along the frustoconical air side surface 28. Each of the pumping ribs 40 extends obliquely to the axis 42 of the seal 10 at an equal helix angle.

Referring to FIGS. 2-5, each of the pumping ribs 40 is defined by a pair of opposite side faces 44 and 46 that mate with each other to form a working or oil scraping edge 48. Each of the pumping ribs 40 is configured to include an axially inner first section 50 and an axially outer second section 52 which are integral with each other. The term "axially inner" or "axially inwardly" as used herein is intended to mean the direction toward the oil side of the seal and the term "axially outer" or "axially outwardly" the direction toward the air side.

The first section 50 has a uniform triangular cross-section throughout the length thereof and has a predetermined controlled height, preferably of about 0.01–0.1 mm, as measured from the plane of the frustoconical surface 28. In contrast, the second section 52 is somewhat bilge-shaped and has a varying cross-sectional dimension. The height of the second section 52 progressively increases from the juncture 54 of the first and second sections, then culminates at the middle portion and thereafter gradually decreases to become zero at the outermost point 56.

The oil seal 10 may be made by molding of an elastomeric material such as synthetic rubber and by trimming of the molded elastomeric member. Molding may be carried out by the conventional injection molding process by using an inner core provided with a plurality of helical grooves designed and configured to mold the pumping ribs 40. Alternatively, compression molding process or transfer molding process may equally be used. The grooves of the inner core are complementary in shape to the pumping ribs 40 shown in FIGS. 2-5, except that the longitudinal length of the portions of the grooves corresponding to the first sections 50 is dimensioned in such a manner that the longitudinal length L of the first sections 50 as molded is sufficiently longer than the final length of the first sections and is preferably equal to about 2 mm.

For molding, the casing 12 is first placed in position in the molds and an uncured elastomeric material is then injected into the mold cavity in a well-known manner. The molded elastomeric material is subjected to curing whereupon the elastomeric material is bonded to the casing 12. After cooling, the molded product is released from the molds to obtain a foreproduct or semiproduct of the oil seal.

Figure 6:
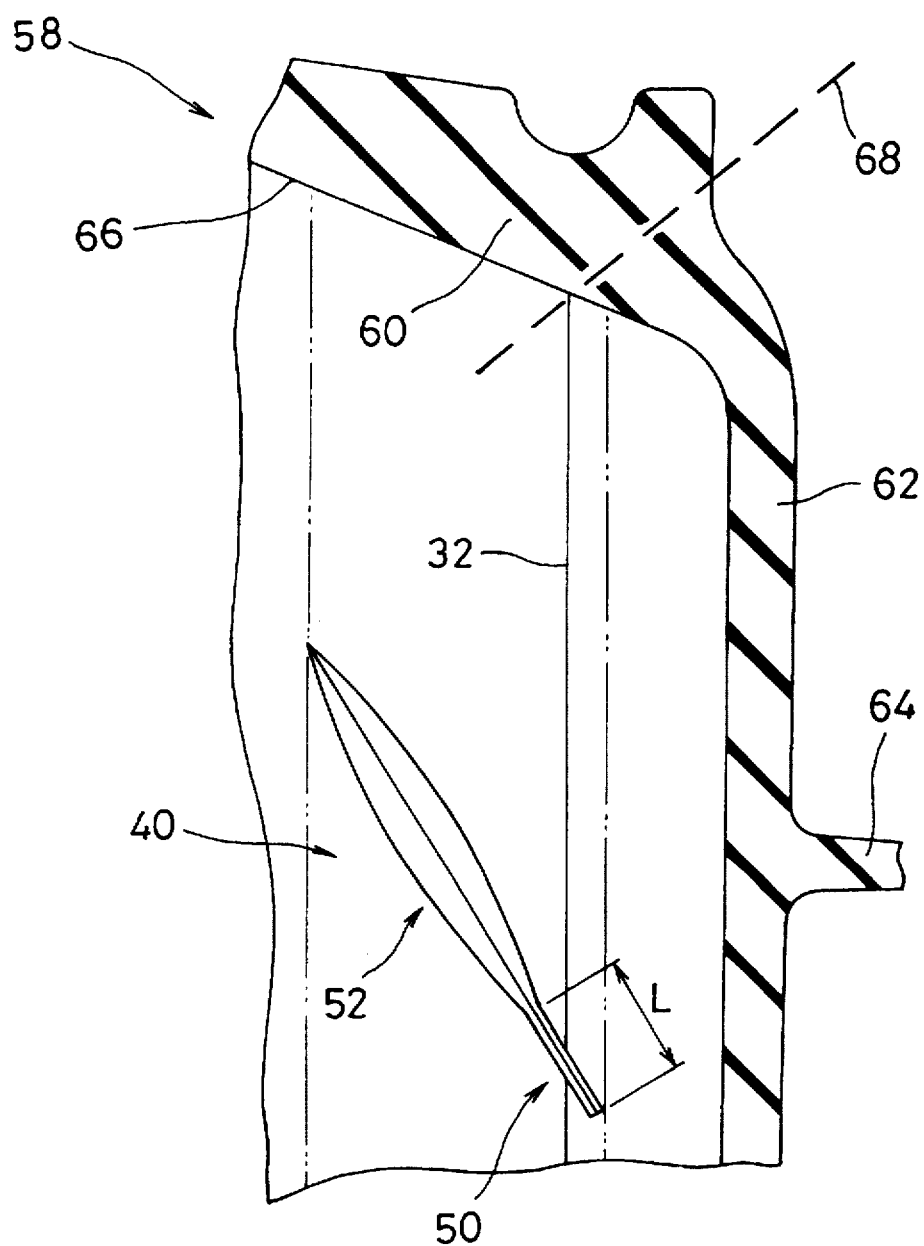
FIG. 6 is a schematic cross-sectional view showing a part of the foreproduct of the oil seal prior to trimming, it being understood that only one of the pumping ribs is shown to simplify the drawing.

Referring to FIG. 6 wherein the foreproduct prior to trimming is shown, the elastomeric member 58 as molded of the foreproduct includes a lip forming portion 60 and an integral hat portion 62 connected to a sprue portion 64. The inner wall 66 of the lip forming portion 60 is a molded surface which is defined by the outer surface of the inner core. The pumping members 40 as molded lie on the frustoconical molded wall 66 throughout the entire length thereof. The first section 50 as molded of each of the pumping members 40 extends throughout the longitudinal length L.

Referring further to FIG. 6, the elastomeric member 58 as molded is then cut by a trimming knife of a conventional trimming machine, not shown, along a frustoconical trim plane 68 to thereby form a sharp sealing edge 32 defined by the oil side surface 30 and the air side surface 28. The trim line 68 is so set that it intersects the length L of the first section 50 as molded, preferably at about the middle of the length L. As the longitudinal length L of the first section 50 is equal to about 2 mm, the trimming knife is well able to cut in between the length L of the first section 50 as molded even if the tolerance of positioning of the trimming knife is 0.2–0.3 mm. In this way, the first sections 50 of a controlled height are formed for a certain axial extent on the air side surface 28 between the sealing edge 32 and the bilge-shaped second sections 52, regardless of any tolerance that may be encountered in positioning of the knife.

Figure 7A:
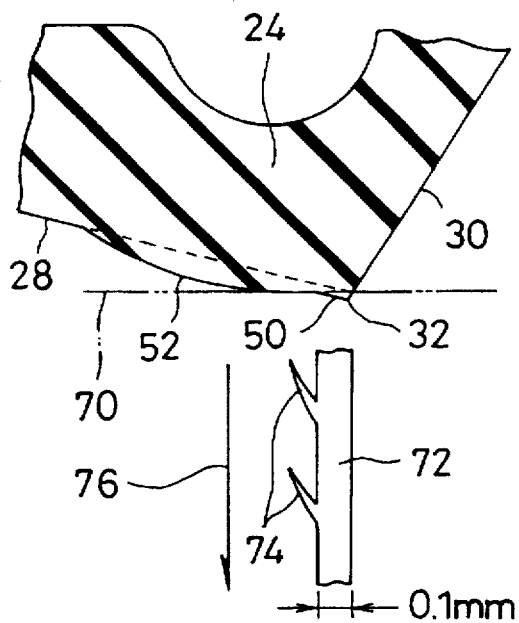
FIG. 7A is a schematic view showing the cross-section and the contact pattern, prior to wear, of the sealing lip and pumping ribs of the oil seal according to the invention.

In use, the mounting portion 20 (FIG. 1) of the seal is press fit in a well-known manner within a housing, not shown. The sealing lip 24 of the seal is interference fit over a shaft as schematically shown in FIG. 7A wherein the phantom line 70 indicates the outer periphery of the shaft. Preferably, the inner diameter of the sealing edge 32 and the spring force of the garter spring 38 are selected such that the sealing edge 32 is slightly compressed to form a static seal band 72 having an axial width of about 0.1 mm, as indicated in the lower part of FIG. 7A.

The portions of the pumping ribs 40 in contact with the shaft present a spinelike contact pattern 74. Under the dynamic conditions of the seal wherein the shaft is rotated in the direction shown in FIG. 7A by the arrow 76, the working edges 48 of respective pumping ribs 40 in contact with the shaft surface operate to scrape oil film and feed oil past the static seal band 72 back to the sealed region 34 by the hydrodynamic pumping action.

During the initial stage of use, the oil seal 10 made according to the method of the invention provides a satisfactory initial sealing performance under both static and dynamic operating conditions.

Under the static conditions of the seal, the portion of the first sections 50 which lies in the static seal band 72 will readily be compressed and flattened against the shaft 70 because the first sections 50 are of a controlled limited height and, therefore, the first sections 50 would not undesirably lift the sealing edge 32 away from the shaft or excessively reduce the radial sealing pressure acting on the sealing edge 32. As a consequence, a continuous static seal band 72 will be formed along the entire circumference of the shaft to develop a sufficient initial static seal performance.

Under the dynamic operating conditions, those parts of the first and second sections 50 and 52 which form the spinelike contact pattern 74 will serve as the pumping blade to achieve the initial hydrodynamic pumping action.

The initial static and dynamic seal capacities achieved by the pumping ribs 40 made according to the invention are more than those which are achieved by the conventional pumping ribs consisting only of the bilge-shaped section. With the conventional bilge-shaped design, trimming could not be carried out accurately enough to cut exactly along the axially inner end of the bilge-shaped pumping ribs. If the trim line were unfortunately offset axially outwardly of the axially inner end of the bilge-shaped pumping ribs, the initial static sealing action would be insufficient because the sealing edge is lifted. If, to the contrary, the trim line were offset axially inwardly of the inner end of the bilge-shaped pumping ribs, the pumping ribs would not be brought in contact with the shaft to a satisfactory extent. The result of this would be that the initial pumping action is insufficient.

Figure 7B:
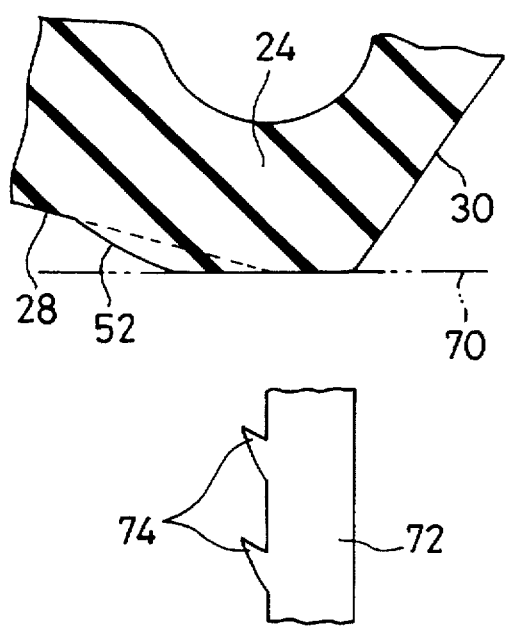
FIG. 7B is a schematic view similar to FIG. 7A but showing the cross-section and contact pattern after a substantial wear.

After the sealing lip 24 and the pumping ribs 40 have undergone a substantial wear as shown in the upper part of FIG. 7B, the static seal band 72 will be expanded as shown in the lower part of FIG. 7B. The first sections 50 will no longer exist so that the spinelike contact pattern 74 will be formed solely by the bilge-shaped second sections 52. As the contact surface now lies in a plane that obliquely traverses the region of the second sections 52 having an increased cross-section, the spinelike contact pattern 74 after wear still has an adequate axial extent so that a satisfactory dynamic pumping action is provided.

Figure 8A:
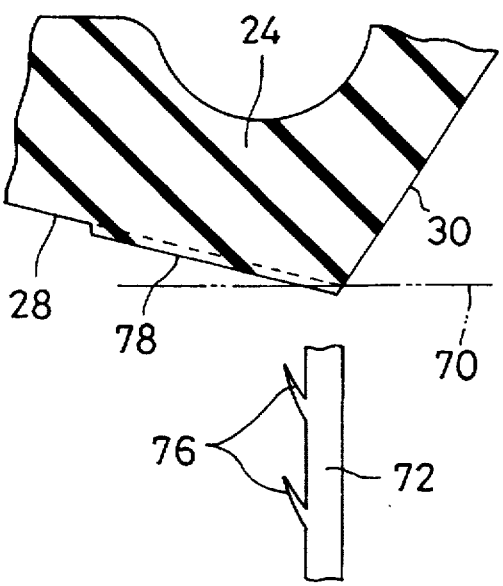
FIGS. 8A and 8B are views similar to FIGS. 7A and 7B, respectively, but showing the conventional oil seal having pumping ribs of a uniform cross-section.
Figure 8B:
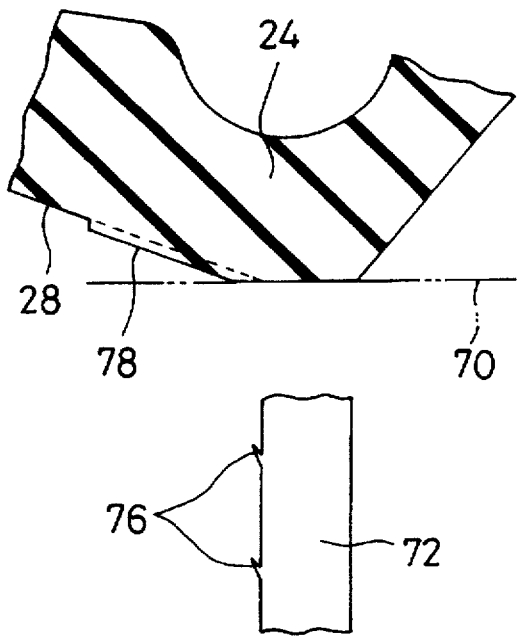

For the purposes of comparison, in FIGS. 8A and 8B there are shown the cross-section and the contact pattern, prior to and after wear, respectively, of a conventional oil seal having helical pumping ribs 78 of a uniform triangular cross-section. It will be noted from FIG. 8A that, at the initial stage of use, the conventional oil seal presents the static seal band 72 and spinelike contact pattern 76 which are comparable with those achieved by the oil seal according to the invention. Accordingly, an initial sealing performance will be provided to a satisfactory degree under both the static and dynamic operating conditions.

However, after a substantial wear has taken place, the spinelike contact pattern 76 formed by the pumping ribs 78 will be substantially diminished in size as shown in FIG. 8B. This is because the cone angle which the frustoconical air side surface 28 forms with the axis of the seal is increased as wear proceeds. As a result, the hydrodynamic pumping action performed by the pumping ribs 78 of the uniform triangular cross-section is considerably reduced upon wear.

The present inventors have carried out a comparative experiment wherein the oil seal 10 according to the invention, the conventional oil seal having pumping ribs of the uniform triangular cross-section as shown in FIGS. 8A and 8B, and the other conventional oil seal having the bilge-shaped pumping ribs were tested for hydrodynamic pumping rate. Each sample was installed between a housing and a shaft and the air side of the sample was filled with oil under atmospheric pressure. While rotating the shaft continuously, the flow rate of oil pumped back to the oil side was measured.

Figure 9:
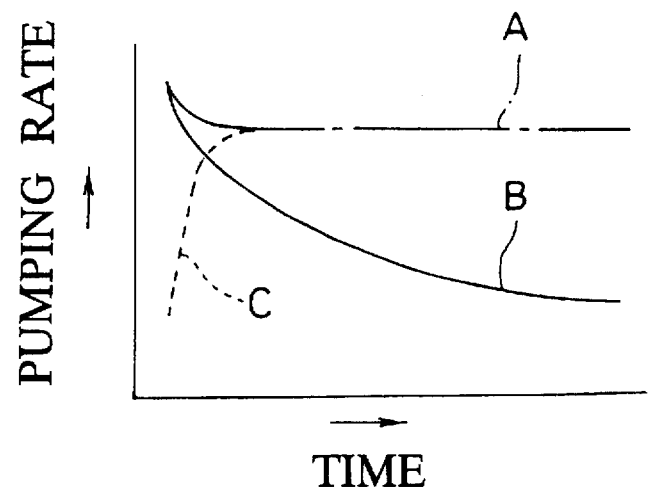
FIG. 9 is a graph showing the variation in the pumping rate of the oil seal according to the invention and of the conventional oil seals.

The results are shown in the graph of FIG. 9 wherein the curve A represents the variation in the pumping rate as a function of time as measured with the oil seal 10 of the invention, the curve B with the conventional oil seal having pumping ribs of the uniform triangular cross-section and the curve C with conventional oil seal having bilge-shaped pumping ribs.

Referring to the graph of FIG. 9, the oil seal 10 according to the invention presented a high initial pumping rate as indicated by the curve A. After wear, the pumping rate was slightly decreased but was maintained at a satisfactorily high level. In contrast, the conventional oil seal having pumping ribs of the uniform triangular cross-section revealed a high pumping rate only in the initial period of use. As wear proceeded, the pumping rate was considerably decreased as shown by the curve B. The curve C indicates that with the conventional oil seal having the bilge-shaped pumping ribs, the initial pumping action is not sufficient. However, the pumping rate was increased with increasing wear of the sealing lip.

In summary, with the oil seal 10 made according to the invention, a high degree of pumping capacity is achieved upon installation as well as after wear so that a satisfactory dynamic sealing performance is provided throughout the life of the seal. In addition, a high degree of initial static seal is established as described before with reference to FIG. 7A.

Figure 10:
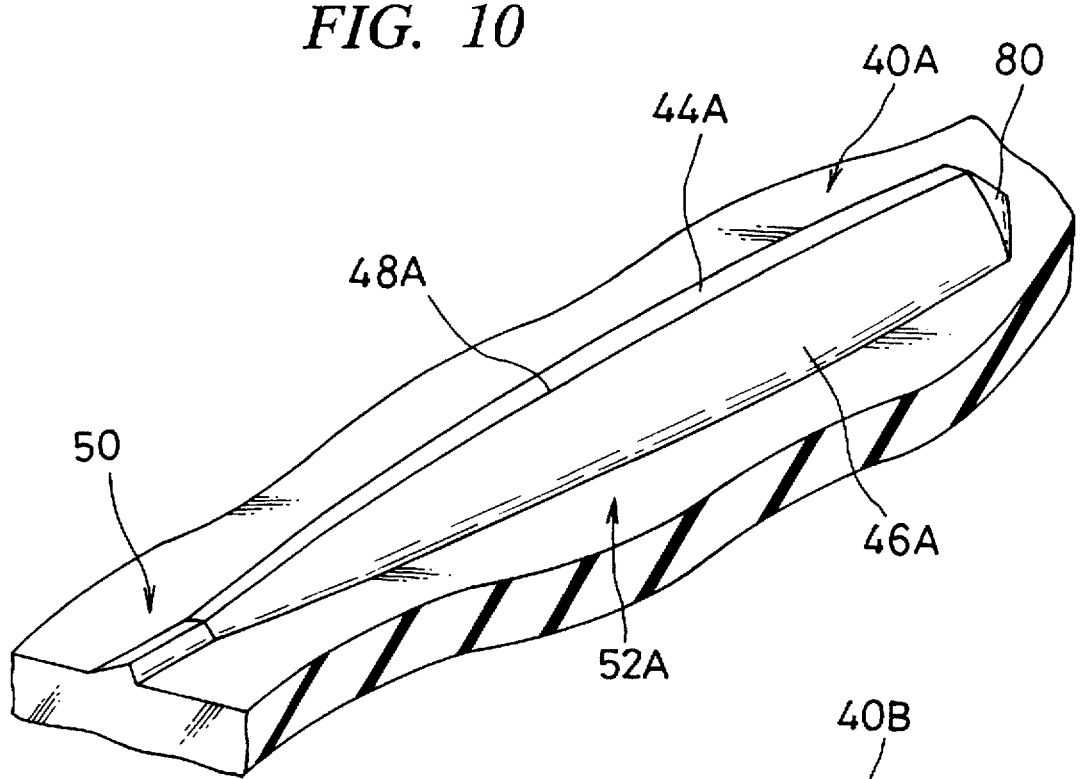
FIGS. 10 and 12 are perspective views similar to FIG. 5 but showing the modified forms of the pumping ribs; and, FIG. 11 is a graph showing the variation in the axial length of the contact pattern formed by the pumping ribs shown in FIGS. 5 and 10.

FIG. 10 illustrates the modified form of the pumping ribs. Each of the pumping ribs 40A includes the first section 50 molded and trimmed in a manner similar to the first embodiment. The pumping rib 40A also includes a second section 52A of a triangular cross-section defined by a pair of curved side faces 44A and 46A meeting together to form a curved working ridge 48A. Throughout substantially the entire length thereof, the second section 52A has a progressively increasing cross-section as it departs from the juncture of the first and second sections. At the axially outer end of the rib 40A, the side faces 44A and 46A terminate at steep end faces one of which is shown at 80.

Figure 11:
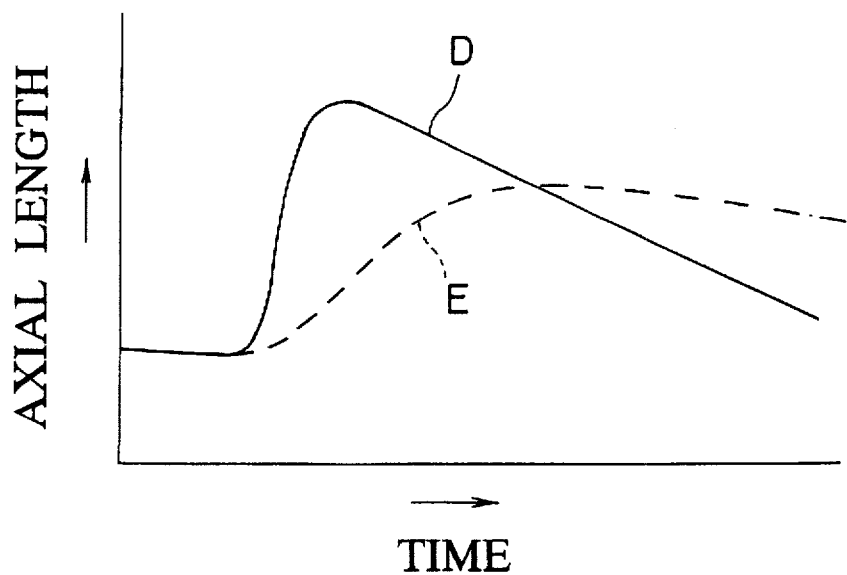

In FIG. 11, there are shown the variation in the axial length of the spinelike contact pattern 74 as a function of time. As wear proceeds, the axial length of the contact pattern 74 of the first embodiment begins to decrease earlier as shown by the curve D because the region of the largest cross-section is situated at the middle of the length of the second section 52. In contrast, the contact pattern 74 of the modified embodiment shown in FIG. 10 outlasts for a longer period of use as shown by the curve E since the height of the second section 52A increases up to near the end thereof. Accordingly, the modified embodiment is suitable in applications wherein a longer service life is desirable.

Figure 12:
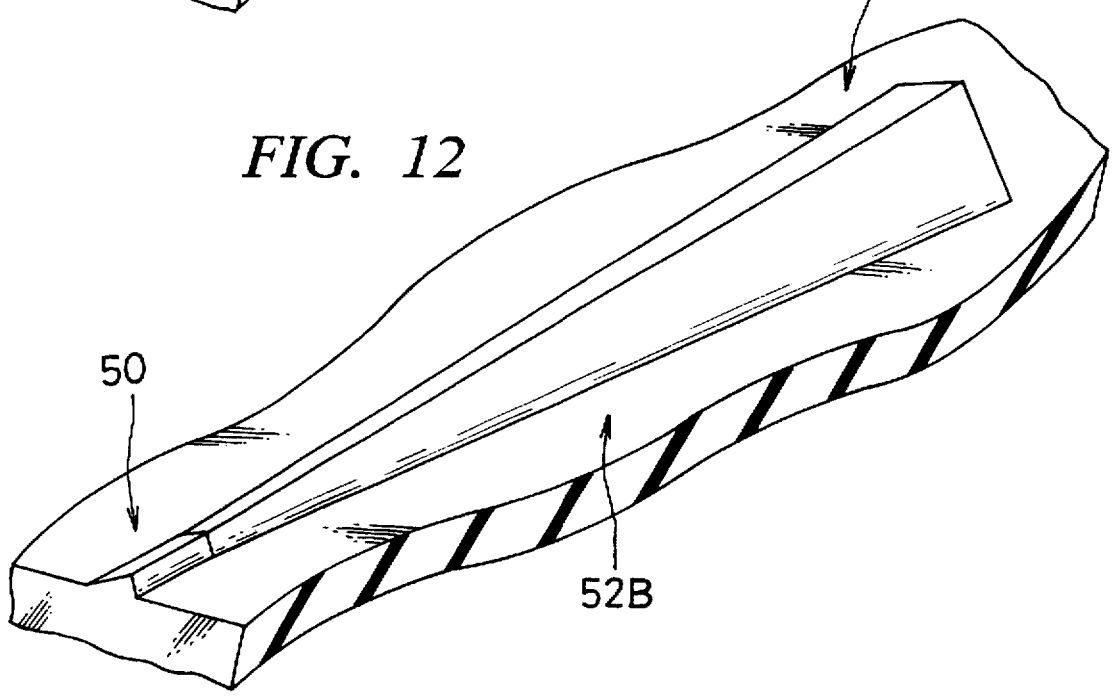

FIG. 12 illustrates another modified form of the pumping ribs. In this embodiment also, each of the pumping ribs 40B includes the first section 50 of a uniform cross-section. The second section 52B has a constantly diverging cross-section.

While the present invention has been described herein with reference to the specific embodiment thereof, it is contemplated that the present invention is not limited thereby and various changes and modifications may be made therein for those skilled in the art without departing from the scope of the invention.

What is claimed is:

1. A method of making an oil seal having a sealing lip defined by a frustoconical air side surface and a frustoconical oil side surface and having a plurality of helical pumping ribs formed on said air side surface, said method comprising:

preparing a foreproduct of said oil seal incorporating a rigid annular casing and a molded elastomeric member bonded to said casing;

said elastomeric member as-molded including an annular lip forming portion and a hat portion joined with said lip forming portion;

the inner periphery of said lip forming portion being defined by a frustoconical molded surface;

said elastomeric member as molded having a plurality of helically extending pumping ribs raised radially inwardly of the plane of said frustoconical molded surface;

each of said pumping ribs being defined by a pair of opposite side faces mating with each other to form a working edge;

each of said pumping ribs having a first section of a predetermined length and a second section integral with and located axially outwardly of said first section;

said first section as molded having a uniform cross-section of a predetermined height throughout the length thereof;

said second section having a cross-section of progressively increasing height for at least a length thereof situated contiguous to said first section; and, cutting said elastomeric member as-molded along a frustoconical trim plane that intersects the length of each said first section to thereby form a sharp sealing edge whereby a length of each said first section of a predetermined height is preserved between said sealing edge and each said second section.

2. The method according to claim 1, wherein said first and second sections have a substantially triangular cross-section.

3. The method according to claim 1, wherein each second section is configured to present a largest cross-section roughly at the middle thereof.

4. The method according to claim 1, wherein each second section is configured to present a largest cross-section roughly at an axially outer end thereof.

5. The method according to claim 1, wherein each second section is configured to present a progressively increasing cross-section substantially throughout the length thereof.

6. The method of claim 1 wherein said predetermined height is between 0.01–0.1 mm.

7. The method of claim 1 wherein said length of said first section is about 2 mm.

* * * * *